United States Patent [19]

Hwang

[11] Patent Number: 5,307,480
[45] Date of Patent: Apr. 26, 1994

[54] METHOD FOR REPORTING POWER FAIL IN A COMMUNICATION SYSTEM

[75] Inventor: Hyo-Hyeon Hwang, Kyounggi, Rep. of Korea

[73] Assignee: SamSung Electronics Co., Ltd., Suwon, Rep. of Korea

[21] Appl. No.: 606,739

[22] Filed: Oct. 31, 1990

[30] Foreign Application Priority Data

Apr. 20, 1990 [KR] Rep. of Korea ............... 1990-5585

[51] Int. Cl.$^5$ ................. G06F 11/00; H03M 13/00
[52] U.S. Cl. ......................... 395/575; 371/66
[58] Field of Search ............. 395/575; 371/66; 364/273.4

[56] References Cited

U.S. PATENT DOCUMENTS

| | | | |
|---|---|---|---|
| 4,744,097 | 5/1988 | Haruhara | 375/7 |
| 4,922,456 | 5/1990 | Naddor et al. | 365/185 |
| 5,212,797 | 5/1993 | Miyake et al. | 395/750 |

*Primary Examiner*—Robert W. Beausoliel, Jr.
*Assistant Examiner*—Ly V. Hua
*Attorney, Agent, or Firm*—Robert E. Bushnell

[57] ABSTRACT

A method for reporting a power fail in a communication system having a real-time clock (RTC) generator with a backup battery and for performing a reservation function stored in a nonvolatile memory. The method includes the steps of: (a) updating real-time data by storing real-time data from the RTC generator into the nonvolatile memory with a predetermined time interval; (b) initializing the communication system and searching a reservation registering area for a reserved job simultaneously; (c) printing the latest updated real-time data and a power fail title with a power fail time when a reserved job is searched in the step (b); (d) printing a title of the reserved job and reading contents of an unperformed reserved job stored into the nonvolatile memory so as to print the unperformed reserved job; and (e) searching for other reserved job at the completion of the step (d) and, if the other reserved job exists, jumping to the step (d).

8 Claims, 4 Drawing Sheets

POWER FAILURE TITLE
└──→46

POWER FAILURE TIME:
└──→48

DELETED DELAY DIAL JOB
└──→50

| NO | TIME | POLLCODE | PHONE NUMBER |
|----|------|----------|--------------|

52

DELETED MAIL BOX
└──→50

| BOX NO | RECEIVER | SENDER | PAGE | DATE & TIME |
|--------|----------|--------|------|-------------|

METHOD FOR REPORTING POWER FAIL IN A COMMUNICATION SYSTEM

BACKGROUND OF THE INVENTION

The present invention relates to a method for reporting a power failure in a communication system, and more particularly to a method for reporting cancellation of reserved jobs due to the power failure in a communication system capable of making reservations for transmitting and receiving signals.

In some data communication systems, a function for making reservations for transmitting and receiving signals is included in order to enable data communication at a desired time in accordance with the trend of industrial development. For example, in facsimile systems, pixel data stored in a memory can be sent to other facsimile systems at a specific time by way of reserved transmission and reserved polling functions, and furthermore mail transmission and receiving reservation functions can be included.

In order to perform the reserved transmitting and receiving functions and the reserved polling function, the pixel data is stored or accessed into/from the memory at a reserved time to perform the reserved functions. However, since most of the pixel data to be transmitted from one facsimile system, and pixel data to be received from another facsimile system by way of reservation and reservation setting data are stored in a DRAM, all of the data are apt to be lost when a power failure occurs. That is, when a power failure occurs, the pixel data and the reservation function data, such as the reserved transmitting and receiving function data, the reserved polling function data, and the mail transmitting and receiving function data, etc., stored in the memory composed of a DRAM is erased. Thereafter, when the power is restored to a normal state, the system will be initialized by a power reset operation of a central processing unit, and then enter into a waiting mode of the CCITT regulation.

Accordingly, when a power failure occurs, all the reserved jobs will be reset. However, the user cannot notice the above status, and even though the user has set the reserved transmission function he cannot verify it. Furthermore, if the reserved receiving function is set and thus the pixel data received from the other facsimile is system erased due to the power failure, the user cannot know the erasure of the received pixel data.

Therefore, when a power failure occurs in a facsimile system having reservation functions, one cannot verify whether the reserved jobs have been performed or not, thus creating a drawback by which successful communication with other facsimile systems will be restricted.

SUMMARY OF THE INVENTION

It is accordingly an object of this invention to provide a method for reporting reserved jobs that are not performed due to a power failure in a communication system having reservation functions.

It is another object of this invention to provide a method for storing pixel data in the volatile memory and the reserved job information of the pixel data into a nonvolatile memory, thereby, when a power failure occurs, enabling the communication system to report the power failure by means of the reserved job information stored in the nonvolatile memory.

According to an aspect of the present invention, a method for reporting a power failure in a communication system having a real-time clock (RTC) generator with a backup battery and for performing a reservation function stored in a nonvolatile memory, includes the steps of:

(a) updating real-time data by after storing real-time data from the RTC generator into the nonvolatile memory periodically for a predetermined time interval;

(b) initializing the communication system and searching for a reservation registering area established in the nonvolatile memory for a reserved job simultaneously;

(c) printing the latest updated real-time data and a power failure title with a power failure time after a reserved job is searched in the step (b);

(d) printing a title of the reserved job and reading contents of an unperformed reserved job stored into the nonvolatile memory so as to print the contents of the unperformed reserved job; and (e) searching for other reserved jobs upon completion of step (d) and, if the other reserved job exist, returning to step (d).

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 1:
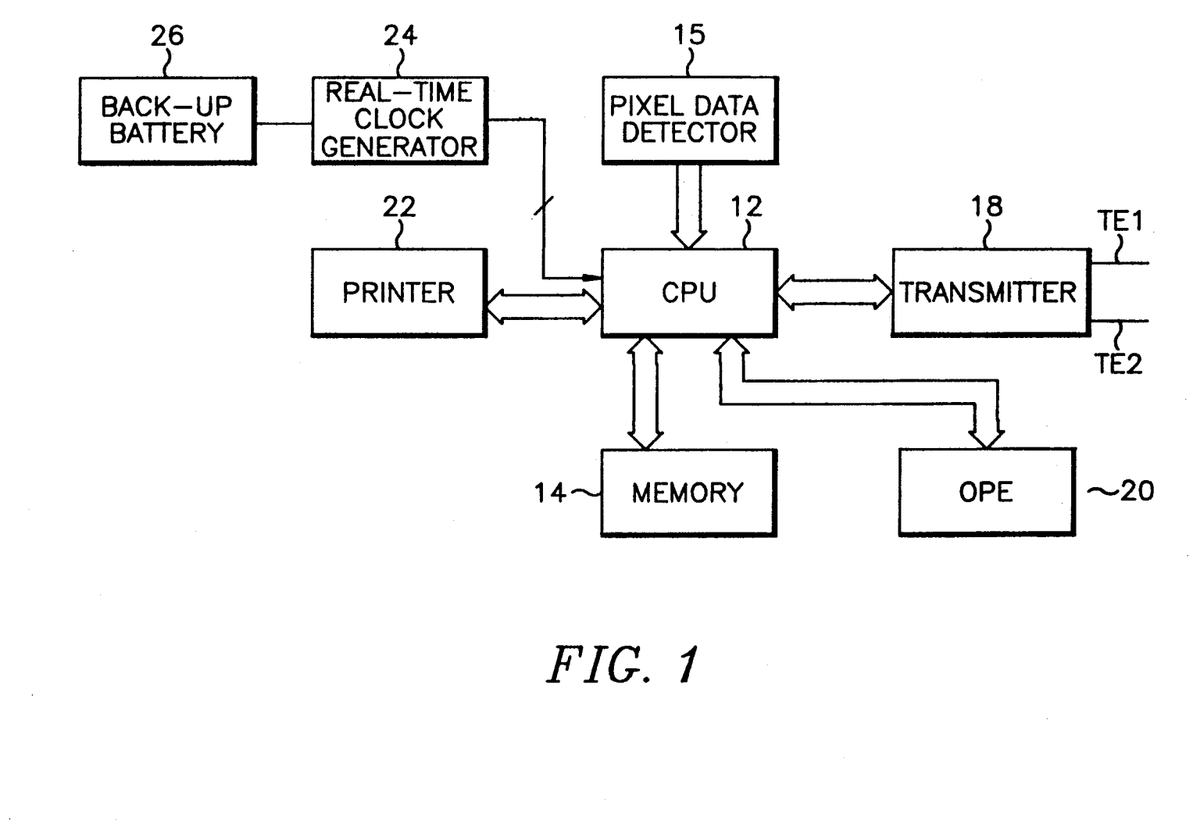
FIG. 1 is a system block diagram according to the present invention.

Referring to FIG. 1, a facsimile system for performing the inventive method includes a central processing unit 12 (hereinafter referred to as CPU for short) which controls input/output data and overall system operations. The CPU 12 is coupled to a memory 14 for programming and storing data thereunto. A pixel data detector 15 scans a document (not shown), quantizes the scanned data from the document into binary information upon comparison of the luminance of the document and a reference luminance and outputs pixel data under control of the CPU 12. Then, an operating panel (OPE) 20 with a number of operating keys enables a display device to display the display data from the CPU 12, and applies to the CPU 12 the display data caused by the depression of the operating keys. A printer 22 prints the output of the CPU 12 under control of the CPU 12; and a transmitter 18 modulates and transmits the output data of the CPU 12 via telephone lines $TE_1$, $TE_2$ under the control of the CPU 12. A real-time clock (hereinafter referred to as RTC) generator 24 operates real-time data (i.e., year, month, date, hour, and minute data) to the CPU 12.

In the above configuration, the memory 14 is composed of a volatile memory are for storing and outputting the pixel data, and a nonvolatile memory area for storing and outputting reserved job data. The RTC generator always operates independently of a source voltage by having a backup battery 26 for keeping and maintaining a real-time in the event that the source voltage is cut off or shut down.

Figure 2:
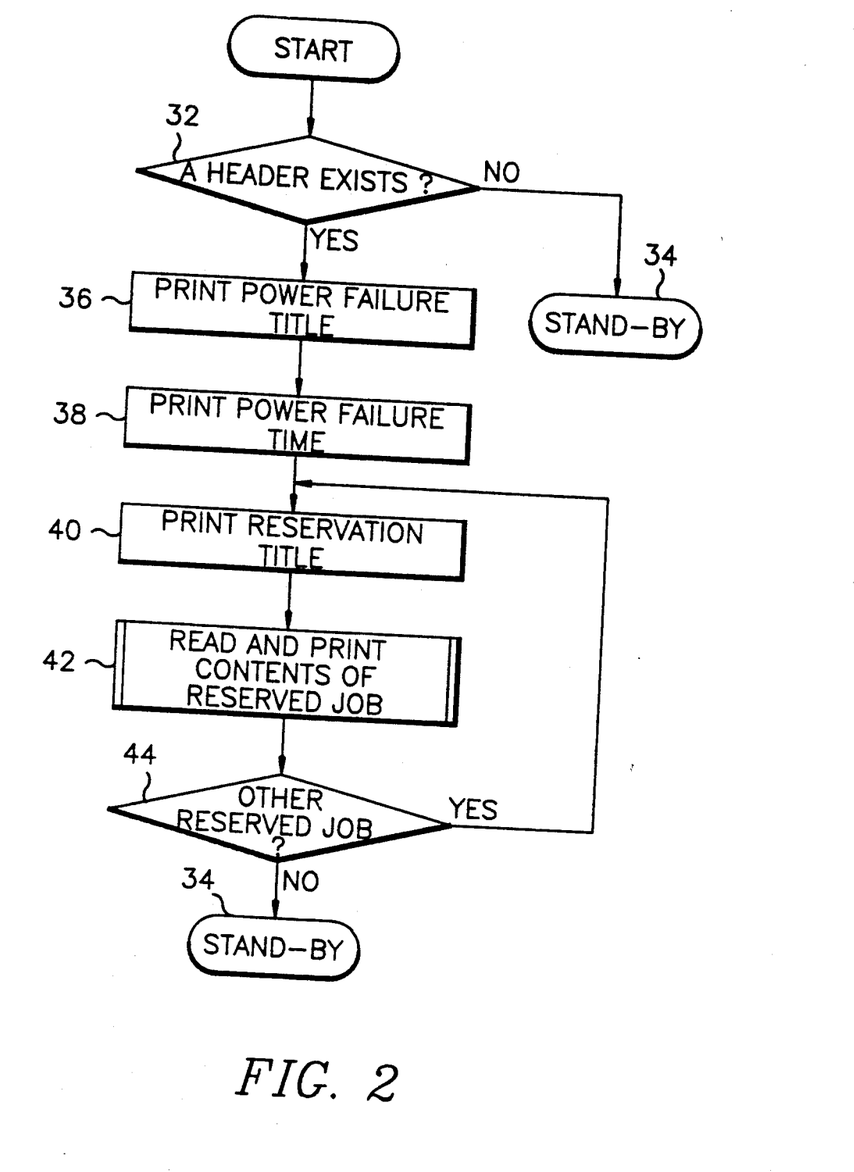
FIG. 2 is a flowchart for a power failure report according to the present invention.

Referring to FIG. 2, the method for reporting a power failure comprises:

a first reserved job searching step for searching for an established reserved job by checking on a reserve job area of a nonvolatile memory for a registered header;

a title printing step for printing a power failure title and the latest updated real-time data with the power failure time when after a reserved job has been established in the first reserved job searching step;

a reserved job's contents printing step for printing a title of the established reserved job and reading the contents of the unperformed reserved job so that the contents of the unperformed reserved job can be printed from the nonvolatile memory; and a second reserved job searching step for searching for other reserved jobs on the reserve job area of the nonvolatile memory, and returning to the reserved job's contents printing step if other reserved jobs exist.

Figure 3:
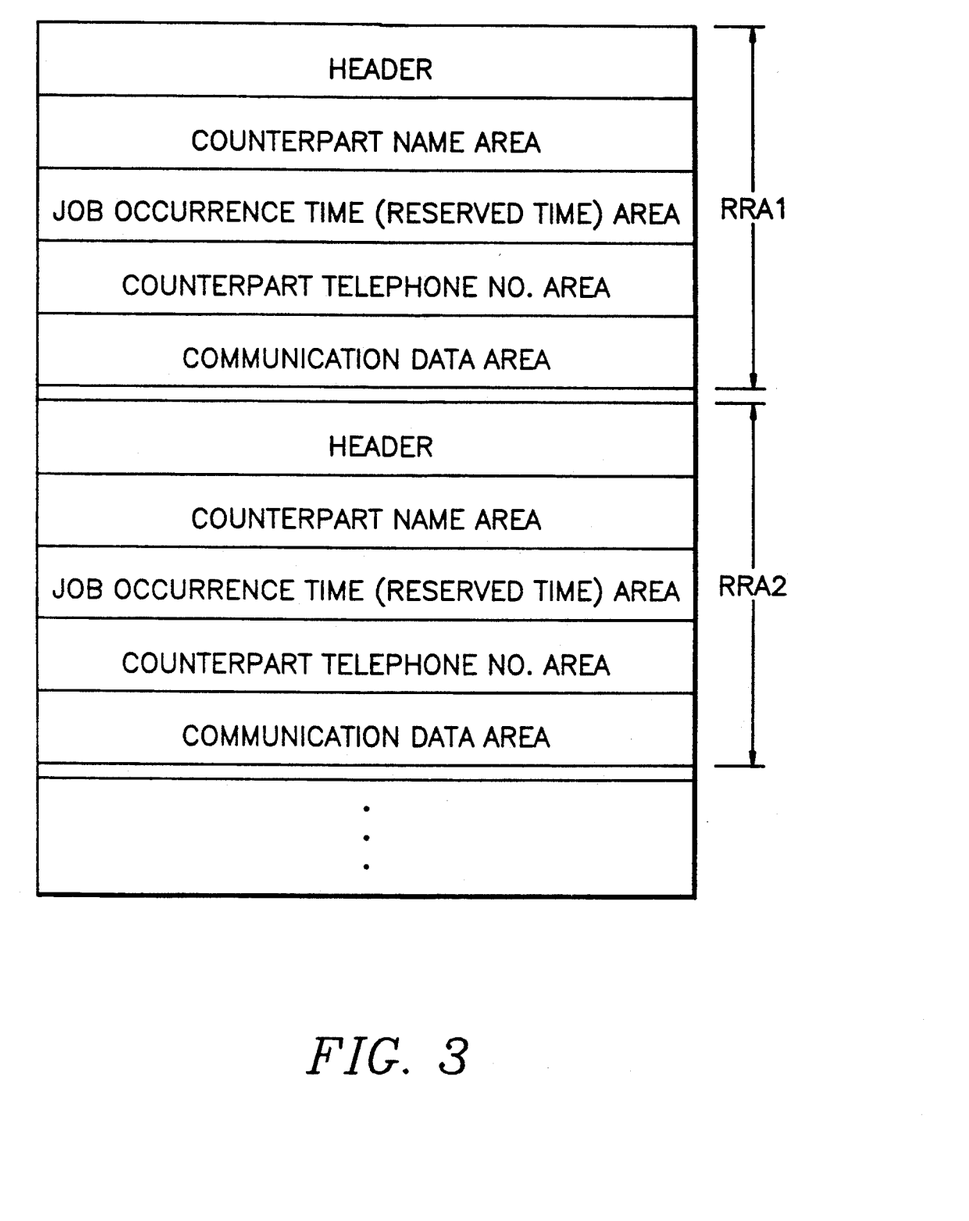
FIG. 3 shows a memory map of reserved job areas according to the present invention.

Referring to FIG. 3, there is illustrated a memory map of a reserved job area established in the nonvolatile memory within the memory 14 of FIG. 1. In the memory map structure, a plurality of reservation registering areas $RRA_1$, $RRA_2$ are registered with various reserved functions.

Each of the reservation registering areas $RRA_1$, $RRA_2$ consists of a header area, a counterpart name area, a job occurrence time (reserved time) area, a counterpart telephone number, and a communication data area. At the header area, the data indicating a status of the reservation registering, reservation non-registering and reservation performance is recorded, and the job occurrence time area is the area for recording the reserved time data. In the reservation registering areas $RRA_1$, $RRA_2$, the data such as reservation transmission data, reservation polling data, etc. is stored, and the reservation registering area is also established for the number of reservation functions.

Figure 4:
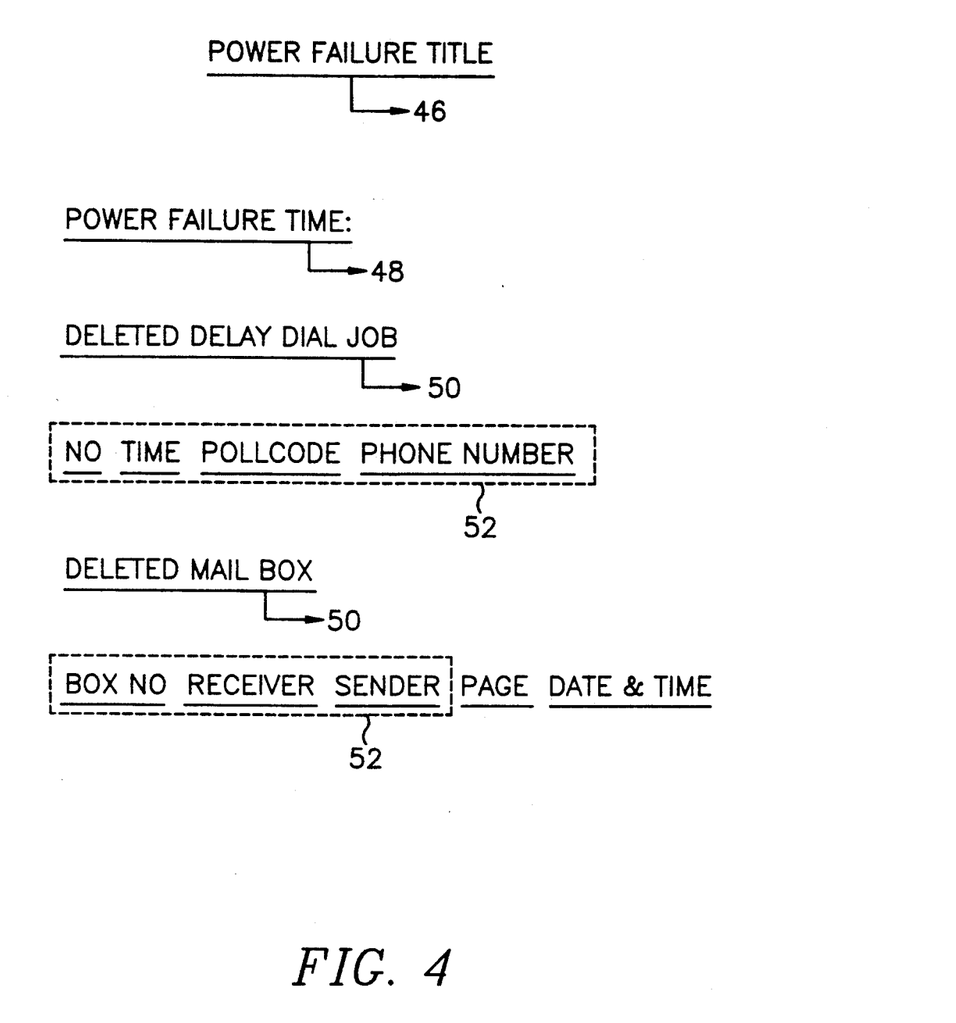
FIG. 4 shows an exemplary format of the power failure report according to the present invention.

Referring to FIG. 4, a power failure report format according to this invention is described in which a power failure title 46, a power failure time 48, a reserved job title 50, and contents of a reserved job 52 are marked.

In advance of describing the operation of the method for reporting a power failure according to this invention, it is assumed that the RTC generator 24 in FIG. 1 generates real-time data, and the pixel data is stored in the volatile memory. It is also assumed that the reservation registering area $RRA_1$ in FIG. 3 is the reserved job area where a reserved transmission job is registered, and the reservation registering area $RRA_2$ is the telephone number, etc. using the operating keys installed on a OPE 20, this information becomes an input to the CPU 12. The CPU 12 then analyzes the information input from the OPE 20, and if it is a reserved function, the information is recorded in the reservation registering area $RRA_1$ as defined in FIG. 3, and a reservation registering status is set in the reservation registering area $RRA_1$'s header. If more mail reservation transmission function keys, reservation times, and counterpart telephone numbers are continuously entered, the CPU 12 records the data in the reservation registering area $RRA_2$ set in a memory 14, and the reservation registering status is recorded in the header.

The CPU 12 that has recorded the reserved function in the nonvolatile memory of the memory 14 as in the above manner, reads the real-time data provided by the RTC generator 24 and updates them in the nonvolatile memory area every 10 msec. The CPU 12 that updates the real-time data in the nonvolatile memory area compares the updated real-time data with the reserved job occurrence time in the reservation registering areas $RRA_1$, $RRA_2$ in the nonvolatile memory area of the memory 14.

If the compared time turns out to be equal to each other, the registered reservation transmission or mail reservation transmission is performed like in a conventional facsimile, and when they are not equal it enters into a the wait state and performs newly occurring jobs. When a reserved job in the reservation registering areas $RRA_1$ or $RRA_2$ is performed, the CPU 12 sets the header of the reservation registering areas $RRA_1$ or $RRA_2$. And upon completion of the reserved functions, the data indicating that the reserved function is completed (unregistered) is set.

Therefore, the CPU 12 later reads the contents of the headers of reservation registering areas $RRA_1$, $RRA_2$ and determines whether the reservation is registered (reserve functions not performed) or unregistered (reserve function completed). In the operating state as the above, when a power failures occurs due to a stoppage of power being supplied to the system in FIG. 1, or due to a system malfunctioning, all the data stored in the volatile memory of the memory 14 is lost and the operation of the entire circuitry is halted except for the RTC generator 24 which is automatically operated by a backup battery 26. When power is restored after an interval of the power failure, the CPU 12 in FIG. 1 is reset by a conventional applied power reset circuit. Therefore, the system in FIG. 1 is initialized by the initialization process of the CPU 12.

The CPU 12 that performed the initialization by a power reset as discussed above, then jumps to the power failure address and executes the program in FIG. 2. The CPU 12 executing the program of FIG. 2 reads the nonvolatile memory area in the memory 14 for a registered header in step 32, and searches for the data in the header of the reservation registering areas $RRA_1$, $RRA_2$ and retrieves the registered header. If no header is found in step 32, the CPU 12 performs the wait mode of the CCITT regulation for facsimile system, and if a header is found, power failure title data recorded on the nonvolatile memory is area read and printed via the printer 22 in step 36 as shown in FIG. 4.

A printer 22 as shown in FIG. 1 is a conventional printing device which prints the printing data from the CPU 12 on a printing paper. The CPU 12 that printed the power failure title in the step 36 reads the final updated real-time data from the nonvolatile memory area of the memory 14, and prints the read data as shown in 48 in FIG. 4 as power failure data in the step 38. The latest updated real-time data in the nonvolatile memory is the real-time data output of the RTC generator 24 updated every 10 msec by the CPU 12 and has not been updated during an interval of the power failure. Therefore, the final updated real-time data becomes the time of the occurrence of the power failure.

The CPU 12 that printed the power failure time in the step 38 enable the printer 22 to print in step 40, a reservation title recorded in the reservation registering areas $RRA_1$, $RRA_2$ of the header found to be registered in step 32 as shown in the reserved job title 50 of FIG. 4.

The CPU 12 that performed the step 40 reads the contents of the reserved job recorded in the reservation registering areas $RRA_1$ or $RRA_2$, prints the read data in a step 42, and retrieves other reserved jobs in step 44.

In step 44, the CPU 12 searches the contents of the header of the reservation registering areas for other reserved jobs which are registered after the search is made in step 32. If other reserved jobs are detected in step 44, the CPU 12 prints the title of the reserve contents of the headers labeled as unperformed by jumping to step 40. If there are no reserve jobs in step 44, the CPU 12 returns to step 34 in a stand by mode and updates the real-time data of RTC generator 24 in the nonvolatile memory of the memory 12 every 10 msec.

As understood from the foregoing description, this invention has an advantage of reporting automatically the status of unperformed reserved jobs due to a power failure so as to allow the user to carry out the unperformed jobs again.

While the invention has been particularly shown and described with reference to a preferred embodiment, it will be understood by those skilled in the art that modifications in detail may be made without departing from the spirit and scope of the invention.

What is claimed is:

1. A method for reserving communication data programmed to be transmitted to designated destinations after a power failure in a communication system having a real-time clock generator with a backup battery, said method comprising the steps of:
    storing reservation data of a registered job in a reservation registering area of a nonvolatile memory, said reservation data comprising communication data and data indicative of designated destinations and corresponding programmable time for enabling transmission of said communication data to said designated destinations;
    storing real-time data from said real-time clock generator into said nonvolatile memory, and periodically updating said real-time data for enabling said communication system to transmit said communication data to said designated destinations when the updated real-time data equals to said programmable time;
    searching said reservation registering area for said registered job upon initialization of said communication system in dependence upon said power failure;
    reading the contents of said registered job to enable said communication system to transmit said communication data to said designated destinations after said power failure 2. The method of claim 1, further comprising the steps of:
    printing the last updated real-time data and a power failure title with a power failure time when said registered job is located; and
    printing a title and the contents of the located registered job.

3. The method of claim 2, further comprising the step of:
    registering said registered job upon completion of the printing of the title and the contents said of the located registered job.

4. The method of claim 1, further comprising the step of: searching for other registered jobs.

5. The method of claim 1, wherein said reservation registering area of the nonvolatile memory comprises:
    a header for indicating status of said registered job; and
    a body area for storing corresponding communication data stored in a volatile memory, said programmable time for enabling transmission of said communication data to said designated destinations of said registered job.

6. A communication device having a real-time clock generator with a backup battery for generating real-time data, and comprising:
    a nonvolatile memory having reservation registering area for storing reservation data of a registered job, said reservation data comprising communication data and data indicative of designated destinations and corresponding programmable time for enabling transmission of said communication data to said designated destinations;
    control means for reporting status of said registered jobs stored in said nonvolatile memory after a power failure of said communication device by:
        storing and updating real-time data from said real-time clock generator into said nonvolatile memory at a predetermined time interval;
        searching said reservation registering area for an unperformed registered job upon initialization of said communication device after said power failure; and
        reading said reservation data of said registered job.

7. The device of claim 6, wherein said control means further prints the last updated real-time data and a power failure report title with a power failure time when said registered job is located and prints a title and the contents of the located registered job corresponding to said unperformed registered job.

8. The device of claim 6, wherein said control means further searches for other registered jobs and prints reservation data corresponding to said other registered jobs.

* * * * *

UNITED STATES PATENT AND TRADEMARK OFFICE
CERTIFICATE OF CORRECTION

PATENT NO. : 5,307,480
DATED : April 26, 1994
INVENTOR(S) : Hyo-Hyeon -Hwang

It is certified that error appears in the above-identified that said Letters Patent is hereby corrected as shown below:

On title page, item [54] and col. 1, lines 1-2 should read as follows:
--METHOD AND APPARATUS FOR REPORTING A POWER FAILURE IN A COMMUNICATION SYSTEM--.

Signed and Sealed this

Twenty-first Day of June, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,307,480
DATED : April 26, 1994  Page 1 of 2
INVENTOR(S) : Hyo-Hyeon Hwang It is certified that error appears in the above-indentified patent and that said Letters Patent is hereby corrected as shown below:

| | | |
|---|---|---|
| Column 2, | Line 15, | Preceding "step", Delete "the" ; |
| | Line 21, | Change "job" to --jobs-- ; |
| | Line 58, | After "under", Delete "the" ; |
| | Line 60, | Change "operates" to --generates-- ; |
| | Line 64, | Change "are" to --area-- ; |
| Column 4, | Line 35, | Delete "applied" ; |
| | Line 54, | Preceding "step", Delete "the" ; |
| | Line 57, | Preceding "step", Delete "the" ; |
| | Line 64, | After "in", Delete "the" ; |
| Column 5, | Line 1, | After "performed", Delete "the" ; |
| | Line 4, | Preceding "step", Delete "a" . |

UNITED STATES PATENT AND TRADEMARK OFFICE
CERTIFICATE OF CORRECTION

PATENT NO. :  5,307,480
DATED      :  April 26, 1994
INVENTOR(S) :  Hyo-Hyeon Hwang Page 2 of 2

It is certified that error appears in the above-indentified patent and that said Letters Patent is hereby corrected as shown below:

IN THE CLAIMS

Column 5,   Line 55,   After "failure", Insert period --.-- ;

Column 6,   Line 10,   Change "registering" to --unregistering-- ;

Line 28,   Change "area" to --areas-- .

Signed and Sealed this

Twenty-seventh Day of December, 1994

Attest:

BRUCE LEHMAN

*Attesting Officer*         *Commissioner of Patents and Trademarks*